(12) United States Patent
Brisighella, Jr. et al.

(10) Patent No.: US 7,401,810 B2
(45) Date of Patent: Jul. 22, 2008

(54) ULTRASONIC WELDED INITIATOR AND CONNECTOR SOCKET

(75) Inventors: Dario G. Brisighella, Jr., Mendon, UT (US); Bradley W. Smith, Ogden, UT (US); Kelly Ellis, Roy, UT (US); Kirk Rasmussen, West Point, UT (US); Matt Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 437 days.

(21) Appl. No.: 11/041,808

(22) Filed: Jan. 24, 2005

(65) Prior Publication Data
US 2005/0121894 A1 Jun. 9, 2005

Related U.S. Application Data

(63) Continuation-in-part of application No. 10/614,155, filed on Jul. 7, 2003, now Pat. No. 7,077,428.

(51) Int. Cl.
*B60R 21/26* (2006.01)
(52) U.S. Cl. .................. 280/741; 280/736; 280/742
(58) Field of Classification Search ................. 280/736, 280/740, 741, 742; 102/530, 531
See application file for complete search history.

(56) References Cited

U.S. PATENT DOCUMENTS

| | | | | |
|---|---|---|---|---|
| 5,834,679 A | * | 11/1998 | Seeger | 102/288 |
| 6,126,197 A | * | 10/2000 | Muir et al. | 280/741 |
| 6,764,096 B2 | * | 7/2004 | Quioc | 280/736 |
| 7,192,054 B2 | * | 3/2007 | Smith | 280/741 |
| 7,210,703 B2 | * | 5/2007 | Young et al. | 280/741 |
| 2004/0061319 A1 | * | 4/2004 | Saso et al. | 280/741 |
| 2006/0082113 A1 | * | 4/2006 | Smith et al. | 280/741 |

* cited by examiner

*Primary Examiner*—Toan C To
(74) *Attorney, Agent, or Firm*—Sally J Brown; Madson & Austin

(57) ABSTRACT

The present invention provides an airbag inflator assembled, in part, using ultrasonic welding. The inflator includes a housing adapted to receive an initiator assembly and an adaptor socket to connect the inflator to the electronic systems of the vehicle. The initiator and the adaptor socket are welded together at a point of interface through the housing of the inflator using an ultrasound welding process. Joint seals are provided that allow the production of a gas-tight seal upon completion of assembly of the airbag inflator.

20 Claims, 7 Drawing Sheets

ULTRASONIC WELDED INITIATOR AND CONNECTOR SOCKET

CROSS-REFERENCED RELATED APPLICATIONS

This application is a continuation-in-part of prior application Ser. No. 10/614,155, filed Jul. 7, 2003 now U.S. Pat. No. 7,077,428, entitled "Airbag Initiator Cover Attachment Apparatus and Method," which is incorporated herein in its entirety by this reference.

BACKGROUND OF THE INVENTION

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury caused by contact with the vehicle's interior.

Many typical airbag systems consist of several individual components joined to form an operational airbag module. Such components generally include an airbag cushion, an airbag inflator, a sensor, and an electronic control unit. Airbag cushions are typically made of a thin fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies currently known in the art to produce a volume of an inflation gas. The inflation gas is channeled into the airbag, inflating it. Inflation of the airbag causes it to deploy, placing it in a position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbag modules has increased, the engineering challenges involved in their design, construction, and use have become better understood. Most airbag modules include an airbag cushion, an inflator, an initiator, and often a housing enclosing the components and electronic connections needed to carry signals from external sensors to the module to cause its deployment. The components of an airbag module must be arranged to provide proper deployment of the airbag cushion. In addition, the components must be mounted to each other and to the vehicle in a manner sufficiently secure to successfully withstand the vibrations, shocks, and other forces experienced in an operating motor vehicle.

Currently, initiators are attached to inflators indirectly, being first placed in an adaptor customized to fit the particular inflator and initiator in use, and then using a crimping process to secure the initiator within the adaptor. The adaptor also includes features provided to serve as a connector socket for the attachment of the electronics used to initiate deployment of the airbag module. Initiators are generally inserted into the adaptors, and then a portion of the adaptor is crimped about the initiator, securing it into place such that when the adaptor is inserted into the airbag module, the initiator is capable of initiating production of inflation gas by the inflator even after long periods of vehicle operation.

The adaptors used in these currently known processes are complex parts that must be individually manufactured to accommodate the connector geometries used by various automotive manufacturers. Often the adaptors are custom-machined parts that are costly to produce and use, thus raising the costs of inflators. Accordingly, a need exists for methods of securely attaching an initiator and a connector socket to an airbag module. It would be a further advantage in the art to provide such a method which avoids the costs associated with the crimping-based methods discussed above, while still providing a gas tight seal. Such methods are provided herein.

BRIEF SUMMARY OF THE INVENTION

The apparatus and method of the present invention have been developed in response to the present state of the art, and in particular, in response to the problems and needs in the art that have not yet been fully solved by currently available airbag inflators and related hardware and methods. Thus, it is an overall purpose of the present invention to provide an airbag inflation apparatus and method that provides for economical production and assembly of the airbag inflator, easy electrical connection of the module to the vehicle, and reliable operation after assembly.

According to one embodiment, an inflator according to the invention is incorporated into an airbag module. The airbag module may optionally be an inflatable curtain module, or IC module, with an inflatable cushion configured to activate to shield a vehicle occupant from impact against a lateral surface of the vehicle, such as a door or window. Alternatively, the airbag module may be a frontal airbag module such as one positioned in a steering wheel or dashboard configured to activate to shield a vehicle occupant from impact against a forward surface of the vehicle such as the steering wheel, dashboard, and/or windshield.

The airbag module also has an inflator disposed in fluid communication with the cushion such that inflation gas is able to flow from the inflator into the cushion. The inflator is coupled to an electronic control unit (ECU) via a connector attached to the end of electric lines extending from the ECU. The inflator and the connector are combined as part of the inflation assembly. The ECU is coupled to an accelerometer that reads the acceleration of the vehicle and transmits an activation signal to trigger deployment of the inflator when a collision is detected.

In some embodiments of the invention, the connector has a head with grips to facilitate grasping by hand. The grips encircle a head, from which a skirt extends. The skirt has a distal ring from which a deflectable tab that protrudes inward. A plurality of ribs also extends inward from the distal ring. The head, grips, and skirt form a main body. An extension extends from the main body to connect to the electric lines.

The inflator has a housing with an initiation assembly including an initiator and a receptacle. The receptacle has a collar and a retainer disposed within the collar. The collar is seated in the housing. The retainer has a generally annular shape and is formed of a resilient material. The retainer has an outside diameter on which a plurality of splines is arrayed.

The inflator housing has an initiation end and a containment end, which may be separate pieces attached together by welding or the like. The containment end contains a quantity of generant designed to ignite to produce inflation gas. The generant may be sealed from the initiator by a burst disc, foil, igniter cap, or other mechanical seal. An initiation passageway may provide communication between the initiator and the seal so that, upon ignition of the initiator, hot gases from the initiator are able to open the seal. The initiator is generally encased by a body and a cover to seal and/or protect the initiator.

The initiator may be of any known variety. According to one example, the initiator has a header eyelet with a generally annular shape. A center pin is centered within the header eyelet and electrically insulated from the header eyelet by an annular seal disposed between the center pin and the header eyelet. The header eyelet is welded or otherwise attached to a charge holder designed to retain a quantity of ignition material. A can may be used to cover and/or seal the ignition material, the charge holder, and a portion of the header eyelet.

A bridge wire lies along the annular seal to electrically couple the header eyelet with the center pin. Upon placement of an electric voltage between the center pin and the header eyelet, current moves through the bridge wire to cause rapid resistance heating and combustion of the bridge wire. Combustion of the bridge wire triggers combustion of the ignition material.

The header eyelet has a skirt designed to receive and encircle a portion of an extending shank of the connector. The header eyelet also has a shoulder that abuts the body. The body has a skirt that encircles the skirt of the header eyelet. The body and the header eyelet may be relatively sized to be press fit together so that gases are not able to pass between the body and the header eyelet. The body has an outward shoulder that abuts the collar. The skirt of the body passes within the collar, and may be sized to provide a press fit with respect to the collar. Alternatively, another portion of the body may be sized to be press fit into the initiation end of the housing.

The body also has an inward shoulder to which the cover is attached. The cover has a rim which may be flared to mate with the inward shoulder. The rim and the inward shoulder may be attached together via ultrasonic welding. The retainer is ultrasonically welded to the skirt of the body. Hence, the retainer is secured to the initiator.

The connector may be easily coupled to the inflator. The distal ring of the skirt of the connector is inserted into the annular space between the retainer and the collar. The deflectable tabs deflect to slide past the splines of the retainer. Meanwhile, distal ring may have to be rotated slightly to cause the ribs of the distal ring mesh with the splines of the retainer. This rotation is facilitated by chamfers on the splines of the retainer and the splines of the connector.

Once the ribs and splines mesh, the skirt may be further inserted until the deflectable tabs move back to their inwardly-extending, relatively undeflected positions. In doing so, the deflectable tabs abut the inward faces of the splines to block withdrawal of the skirt from the receptacle. Thus, the connector is nonremovably retained by the retainer. The splines and ribs continue to mesh to prevent relative rotation between the connector and the inflator.

The initiation assembly may be manufactured in a variety of ways. According to one example, the retainer, the body, the cover, and the skirt of the connector may all be formed of polymeric materials. The collar and inflator housing may be formed of metals such as steel or aluminum. The initiator may be manufactured according to known pyrotechnic initiator manufacturing methods.

The collar is pressed onto the skirt of the body. The retainer is then ultrasonically welded to the skirt of the body. The initiator subassembly is then inserted such that the skirt of the header eyelet passes within the skirt of the body. The cover is ultrasonically welded to the inward shoulder of the body to generally encase the initiator. The initiation assembly, e.g., the body, cover, retainer, initiator, and collar, are then attached together. The initiation assembly is inserted into the initiation end of the inflator housing such that the initiator and the cover extend into the initiation passageway. The initiation end is crimped to retain the collar, and hence, the entire initiation assembly.

According to alternative methods, the initiator subassembly may be inserted into the body, and the cover may be attached to the body prior to insertion of the skirt of the body into the collar. The remaining steps in the assembly process are then similar to those described above.

According to another embodiment of the invention, an inflation assembly may utilize the connector of the previous embodiment with an initiation assembly having a different configuration. The initiation assembly has a receptacle that utilizes a washer in place of the collar to facilitate retention of the initiation assembly in an inflator housing. The washer has an inside diameter along which splines are arrayed.

The initiation assembly also has an initiator, a body, and a cover attached to the body to generally encase the initiator. The body has an outward shoulder that abuts the washer. The cover is snap fitted, or snapped into engagement, with the body. More specifically, the cover has a rim with a lip, and the body also has a lip. The rim of the cover is able to enlarge with respect to the body to permit the lips to slide past each other. Then, when the rim returns to its original size, the lips of the body and the cover are interlocked.

The initiation assembly also includes an o-ring that encircles the cover, proximate the rim. The initiation end of the housing is shaped such that the o-ring is compressed between the cover and the initiation end to form a seal. The initiation end has a crimped lip outside the washer to hold the washer, and thence, the remainder of the initiation assembly, in place.

The initiation assembly may be installed by, first, snapping the body and the cover around the initiator. The o-ring may then be positioned in the initiation end, and the body, cover, and initiator may be inserted. Then, the washer may be disposed to rest against the outward shoulder of the body, and the initiation end may be crimped to hold the washer in place.

According to another alternative embodiment, an inflation assembly includes the connector of the previous two embodiments and an inflator with a modified initiation assembly and receptacle. The receptacle has a collar and a washer designed to fit inside the collar. The collar has an interior diameter on which splines are arrayed.

The initiation assembly includes an initiator, a body, and a cover designed to be ultrasonically welded to the body to generally encase the initiator in a manner similar to that described previously. The body has an outward shoulder that abuts the washer and an inward shoulder to which a rim of the cover is attached. The body also has a press fit portion sized to be press fitted within the collar. The washer is effectively sandwiched between the body and the collar to ensure that the body remains properly positioned within the collar. A crimped lip is formed in the collar to retain the cover. The crimped lip cooperates with the washer and the interior geometry of the collar to retain the entire initiation assembly.

The initiation assembly may be assembled by, first, attaching the body and the cover to each other to generally encase the initiator. The washer may be positioned around the body. The washer, body, cover, and initiator may then be installed in the collar and the collar may be crimped to hold the washer, body, cover, and initiator in place. The collar may then be seated in the initiation end of the inflator housing.

According to another embodiment of the invention, an inflation assembly may utilize the same connector, in conjunction with an inflator having a modified initiation assembly. The initiation assembly has a receptacle that includes a collar and a washer. The washer is disposed within the collar. The initiation assembly also includes an initiator and a body and cover that are ultrasonically welded together to generally encase the initiator.

The body is insert molded around the washer and the initiator. The washer protrudes from the body to abut the interior of the collar to ensure that the body remains properly positioned within the collar. The initiation assembly may be assembled by first, insert molding the body around the washer. The initiator is then inserted into the body and washer, and the cover is inserted to cover the remainder of the initiator, and ultrasonically welded to the body. The initiator, body, cover, and washer are then inserted into the collar and a crimped lip is formed in the collar to abut the rim of the cover, thereby retaining the initiator, body, cover, and washer within the collar. The collar is then seated in the initiation end of the inflator housing.

According to another alternative embodiment of the invention, an inflation assembly has a connector identical to those of the previous embodiments and an inflator with a modified initiation assembly. The initiation assembly has a receptacle with a stamped collar. The stamped collar has an inside diameter on which a plurality of splines are formed.

The initiation assembly also has an initiator and a body and cover ultrasonically welded together to generally encase the initiator. The body is insert molded around the collar in such a manner that the body has a skirt disposed inward of the collar and a remainder that generally encircles the collar. Thus, the collar is effectively sandwiched between the skirt and the remainder of the body. The body has a press fit portion sized to be press fitted into the initiation end of the inflator housing.

The initiation assembly is assembled by insert molding the body around the collar, and then inserting the initiator into the body. The cover is disposed on the initiator and ultrasonically welded to the body. The collar, body, initiator, and cover are then inserted into the initiation end of the inflator housing. The initiation end is crimped to retain the collar, and thence, the body, initiator, and cover.

According to another embodiment of the invention, an inflation assembly includes the same connector used in conjunction with an inflator having a modified initiation assembly. More precisely, the initiation assembly has a collar having an interior diameter on which splines are arrayed. The initiation assembly also has an initiator generally encased by a body and a cover. The cover snaps into engagement with the cover in the manner described in connection with a previous embodiment.

The body has an outward shoulder that abuts the interior of the collar. The collar has a generally conical interior surface that receives the outward shoulder. An annular ridge extends from the generally conical interior surface to press into the outward shoulder. Deformation of the outward shoulder by the annular ridge forms a seal tending to keep moisture out of the initiator and the remainder of the inflator. The collar is crimped to retain the body, cover, and initiator.

The initiation assembly may be assembled by inserting the body into the collar, then inserting the initiator into the body. The cover may then be disposed on the initiator and snapped into engagement with the body. The collar may then be crimped to retain the body, cover, and initiator, thereby pressing the annular ridge into the body. The collar is then seated in the initiation end of the inflator housing.

According to another embodiment of the invention, an inflation assembly includes the same connector, used in conjunction with an inflator for an airbag such as a driver's side front impact airbag. The inflator has a housing with an initiation end in which a socket is formed to receive an initiation assembly. The initiation assembly includes a washer, an initiator, a body, and a cover. The washer has an inside diameter on which splines are formed to mesh with the ribs of the connector.

The body and the cover are snapped together to generally encase the initiator in a manner that has been described previously. The body has an outward shoulder that abuts the washer. The washer is welded to the initiation end of the inflator housing. An o-ring is disposed by a rim of the cover to seal the initiator and the remainder of the inflator.

The initiation assembly may be assembled by, first snapping the body and cover together around the initiator. The o-ring may be positioned, either within the socket or around the cover. The cover, body, and initiator are then inserted into the socket. The washer is disposed to cover the socket and welded to the housing to retain the body, cover, initiator, and o-ring.

According to another embodiment of the invention, an inflation assembly includes the same connector, used in conjunction with a driver's side inflator having a different housing and initiation assembly. More specifically, the housing has an initiation end and the initiation assembly has a collar welded to the initiation end. The initiation end of the housing has an inside diameter on which splines are arrayed to mesh with the ribs of the connector.

The initiation assembly has an initiator and a cover and a body that are ultrasonically welded together around the initiator to generally encase the initiator. The body has an outward shoulder that abuts the initiation end of the housing. The outward shoulder has an annular recess that receives an o-ring.

The initiation assembly may be assembled by, first, ultrasonically welding the body and the cover together around the initiator. The o-ring is inserted into the annular recess of the outer shoulder, and the initiator, the cover, and the body are inserted into the collar. The collar is then welded to the ignition end of the housing.

According to another embodiment of the invention, an inflation assembly includes the connector of the first embodiment, used in conjunction with a driver's side inflator having a different housing and initiation assembly. More specifically, the housing has an initiation end with a socket formed therein. The receptacle includes a retainer, on which splines are arrayed to mesh with the ribs of the connector.

The initiation assembly has an initiator and a cover and a body that are ultrasonically welded together around the initiator to generally encase the initiator. The body has an outward shoulder that abuts the socket and a skirt that extends through the socket. The retainer is ultrasonically welded to the skirt.

The initiation assembly may be assembled by, first, ultrasonically welding the body and the cover together around the initiator. The initiator, the cover, and the body are inserted into engagement with the socket. The retainer is then ultrasonically welded to the skirt so that the retainer, the initiator, the cover, and the body remain coupled to the socket.

According to another embodiment of the invention, an inflation assembly includes the connector of the first embodiment, used in conjunction with a driver's side inflator having a different housing and initiation assembly. More specifically, the housing has an initiation end with a socket formed therein. The receptacle includes a retainer, on which splines are arrayed to mesh with the ribs of the connector.

The initiation assembly has an initiator and a cover and a body that are ultrasonically welded together around the initiator to generally encase the initiator. The body has an outward shoulder in which an annular recess is formed. An o-ring is disposed within the annular recess. The outward shoulder and the o-ring abut the socket to prevent gas flow into or out of the inflator through the socket. The body also has a skirt that extends through the socket. The retainer is ultrasonically welded to the skirt.

The initiation assembly may be assembled by, first, ultrasonically welding the body and the cover together around the initiator. The o-ring is inserted into the annular recess. The initiator, the cover, the body, and the o-ring are inserted into engagement with the socket. The retainer is then ultrasonically welded to the skirt so that the retainer, the initiator, the cover, and the body remain coupled to the socket.

If desired, receptacles for different inflators may have different numbers of splines to ensure that each inflator can only be connected to the proper connector. In the case of an adaptive inflator including multiple initiators, two receptacles may be provided in the inflator to couple connectors to two different initiators. The two receptacles may have different numbers of splines to ensure that each connector is coupled to the proper receptacle.

According to other alternative embodiments, connectors and receptacles having other features besides splines and/or ribs may be used to "key code" an inflation assembly to prevent improper assembly. For example, a connector may have a circular, triangular, square, pentagonal, or hexagonal shape. An inflator receptacle may have a corresponding shape that receives the shape of the connector. Such shapes may also enable insertion of the connector into the receptacle in multiple orientations without permitting post-assembly rotation.

In an alternative embodiment of the invention, another inflator for an airbag cushion is provided in which the initiator and connector socket are linked by ultrasonic welding, while providing a substantially gas-tight seal at the weld. This inflator includes an inflator housing with a containment end and an initiation end. The initiation end includes an initiator opening passing completely through it for receiving the initiator. A joint seal is placed about the inflator opening against a surface of the initiation end of the inflator housing. The joint seal is configured to at least substantially completely encompass the inflator opening. When assembled, the inflator further includes an initiator passed through the initiator opening, and thus, through the joint seal.

The initiator may be assembled by pressing the initiator through the initiator opening from the inside face of the initiation end of the inflator housing. This places a portion of the initiator within the receptacle formed in the initiation end of the inflator housing. The receptacle is configured to receive an inflator adaptor socket which is placed within the receptacle from below. The adaptor socket is then attached to the airbag initiator. The socket is often attached to the portion of the initiator extending through the initiator opening. This attachment is generally made using ultrasonic welding. When this weld is made, the joint seal is trapped tightly between the initiator and the adaptor socket at the inflator opening, producing a gas-tight seal.

In some embodiments of the inflators of the invention, the initiator is constructed to include a welding ridge to aid in welding the socket and the initiator together. This welding ridge may extend through the initiator opening toward the adaptor socket such that it contacts the adaptor socket during assembly of the inflator. This welding ridge may serve at least in part to form the weld bonding the initiator to the socket. An upper surface of the socket cooperates with the welding ridge to form the weld during assembly of the inflator during the ultrasonic welding step of the inflator assembly.

The inflators of the invention include a joint seal provided to segregate the contents of the inflator from the environment outside of the inflator. In some instances, the joint seal may be a ring-shaped seal. During assembly of the airbag inflators of the invention, the joint seal may be placed against either an inner surface of the initiation end of the inflator housing or against an outer surface of the initiation end of the inflator housing. In either position, the seal is held tightly in position when the adaptor socket is secured to the initiator. This may be done in such a fashion as to seal the inflator opening in a gas tight manner.

Yet other inflators according to the invention are configured to be multi-stage inflators by including more than one initiator. As such, the initiation ends of the housings of the inflators include a plurality of initiator openings, joint seals, initiators, and adaptor sockets. In some instances, the number of initiators and adaptor sockets is equal. In others, a single adaptor socket may be provided which includes a plurality of openings to receive multiple initiators. Specific embodiments provide a dual-stage inflator with two adaptor sockets formed.

As with previously-discussed inflators, the socket and initiator may be joined using ultrasonic welding. Thus, as with the inflators previously discussed herein that are assembled by ultrasonic welding, the initiator and the socket both include surfaces that contact during assembly. These interacting surfaces form the weld zone in which the material of either or both the initiator and the socket becomes plastic during the welding process to form the weld and hold the initiator and the socket together. In some specific configurations, the initiator includes a welding ridge that extends from a surface of the initiator to contact the adaptor socket during assembly of the inflator to facilitate formation of the weld.

The initiation assemblies provided by the present invention are not limited in application to airbags. Rather, the systems and methods of the invention may be used in conjunction with a variety of pyrotechnic devices such as explosives, flares, visual effects, and the like.

Through the system and method of the present invention, an inflator may be relatively inexpensively manufactured and assembled with reduced use of time- and labor-intensive operations such as machining of socket parts. The inflator may be reliably sealed without the installation of extra sealing parts. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
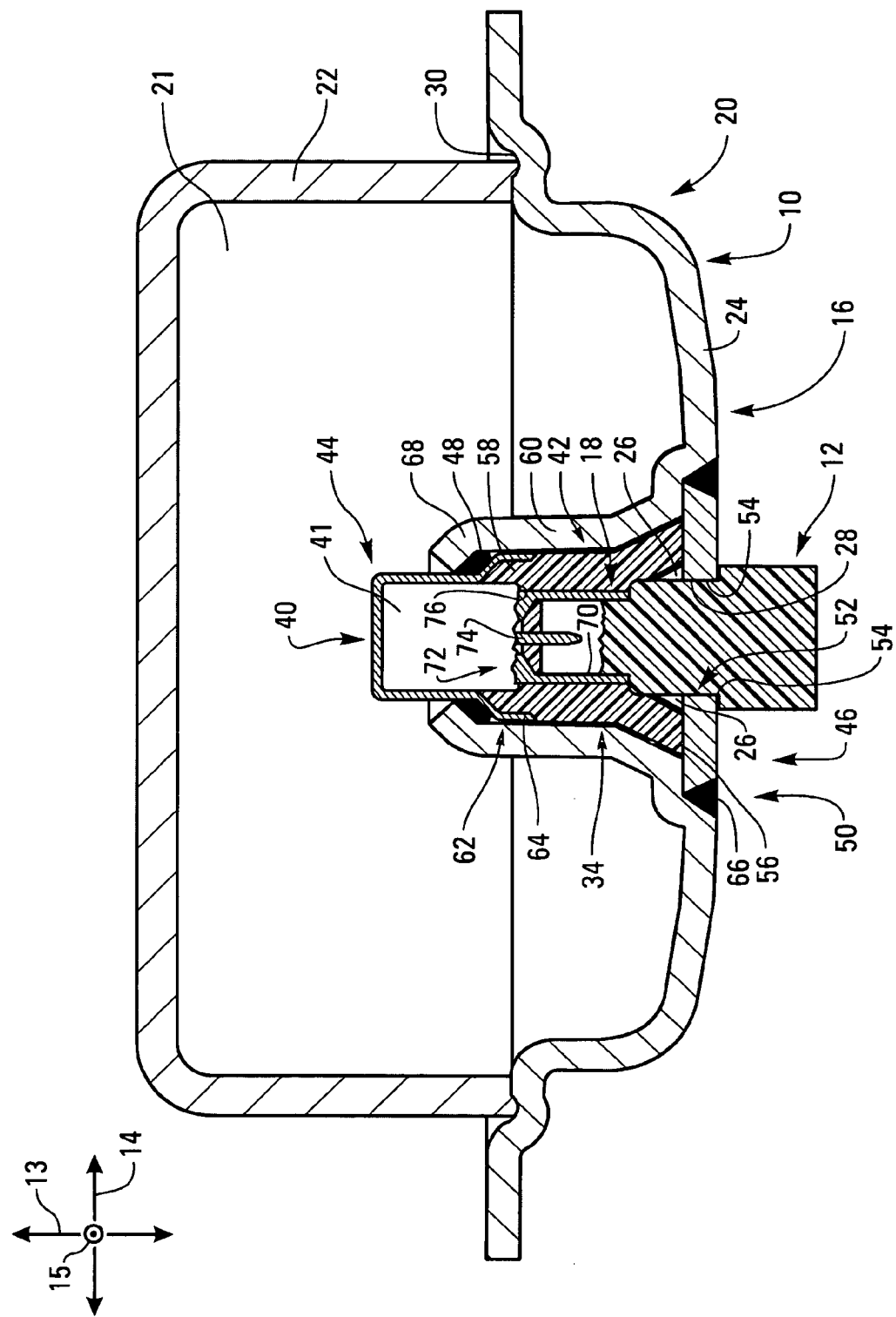
FIG. 1 is a side elevation, section view of an inflation assembly according to another alternative embodiment of the invention, with the connector connected to the inflator.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention utilizes a number of different principles to enhance the cost-effectiveness, electrical connectability, and reliability of inflators. Through the use of the present invention, labor intensive processes such as insert molding and machining may be reduced or eliminated from the inflator manufacturing process. The electrical connector may be easily connected to the inflator in a wide variety of orientations without subjecting the inflator and connector to the risks associated with free rotation of the connector within the inflator. The manner in which these results are obtained by the present invention will be described in greater detail, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

As discussed herein, ultrasonic welding is one of several possible methods by which the portions of the airbag inflators of the invention may be attached together. Other forms of vibratory welding may also be used in some embodiments of the invention. In this application, "vibratory welding" refers to a process by which vibrations are induced along an interface to be welded to cause frictional heating. Hence, ultrasonic welding is one type of vibratory welding. Furthermore, electromagnetic welding, or welding through the application of electromagnetic radiation, may alternatively be used to attach the components of the inflator together. Radio frequency welding, also known as "RF welding," is one type of electromagnetic welding.

FIG. 1 is a side elevation, section view of a first embodiment of the invention, in which an airbag inflator 10 is provided. As shown, the inflator 10 is of a type suitable for a driver's side front impact airbag or the like. The various inflation assemblies of the present invention are thus not limited in application to any specific inflator or airbag type. The inflator 10 may be used in conjunction with the connector 12 to provide an inflation assembly 16. In the Figures of this application, as shown in the axis presented, 13 designates a vertical axis or direction, 14 designates a lateral axis or direction, and 15 designates a transverse axis or direction.

The inflator 10 includes a housing 20 including a containment end 22 and an initiation end 24 joined at a weld 30. The housing 20 is configured to surround an initiation assembly 34 and a quantity of inflation gas generant material (not shown) used to produce inflation gas for inflating an airbag cushion. The initiation assembly 34 generally includes an initiator 40, an initiator body 42, and an initiator cover 44.

As shown, the inflator 10 has a housing 20 that generally contains an initiation assembly 34. The initiation assembly 34 includes a receptacle 46 designed to receive the connector 12. The receptacle 46 includes a washer 50 that retains the connector 12 to the inflator 10. The washer 50 has an inside diameter 52 on which splines 54 are arrayed.

The housing 20 has an initiation end 24 in which the initiation assembly 34 is generally disposed. Additionally, the housing 20 has a containment end 22 that contains a quantity of generant material (not shown) which may be selected from many such materials known to one of ordinary skill in the art. The containment end 22 meets the initiation end 24 at a junction 30, which may comprise a weld, mechanical fastener array, or other mechanism that attaches the containment end 22 to the initiation end 24. A socket 60 is formed in the initiation end 24 to receive and retain the initiation assembly 34. The generant may be in direct contact with the socket 60, or may be separated from the socket 60 by a burst disc or the like.

In addition to the washer 50, the initiation assembly 34 includes an initiator 40, a body 42, a cover 44, and an o-ring 48. As shown, the cover 44 is snap-fitted to the body 42. The body 42 has an outward shoulder 56 and a lip 58. The cover 44 has a rim 62 with a lip 64 that can expand to snap into engagement with the lip 58 of the body 42. The o-ring 48 prevents gas from entering or exiting the interior of the inflator 10 through the region encircling the body 42, or the region between the body 42 and the socket 60.

As illustrated, the washer 50 is not retained by any type of crimped lip, but is rather secured flush with the outer wall of the initiation portion 24 of the housing 20 by a weld 66. The weld 66 may be a conventional thermal weld extending around the circumference of the washer 50, a projection weld, or a laser weld. The socket 60 may have a lip 68 that retains the o-ring 48, and thence, the remainder of the initiation assembly 34. The lip 68 may be crimped or may be formed by the same operations used to form the remainder of the socket 60.

The connector 12 is installed in the receptacle 46 by inserting a shank 18 of the connector 12 into the skirt 70 of the header eyelet 72 of the initiator 40. When this is done, the deflectable tabs 26 deflect to slide past splines 54. The splines 54 are easily aligned with the ribs 28 of the connector 12 and mesh with the ribs 28 to permit the deflectable tabs 26 to move clear of the splines 54. The deflectable tabs 26 then return to a less deflected state to block removal of the connector 12 from the receptacle 46. The meshing of the splines 54 with vertical ribs 28 of the connector 12 prevents relative post-assembly rotation.

The inflator 10 may be manufactured by first forming the housing 20 via stamping, or the like. According to one example, the socket 60 is stamped into the initiation end 24 via a die having a corresponding shape. The lip 68 may be formed as part of the stamping process, or may be separately crimped into shape, if desired. After the initiation end 24 and the containment end 22 are formed, the generant may then be inserted into one of the ends 24, 22 and the ends 24, 22 may be attached together at the junction 30 via inertial welding, fastening, or the like.

The body 42 and the cover 44 may be snapped together around the initiator 40. The o-ring 48 is then inserted into the socket 60 or disposed around the cover 44, and the cover 44, body 42, and initiator 40 are inserted into the socket 60 such that the o-ring 48 is compressed between the lip 68 and the cover 44 as shown. Then, the washer 50 is positioned and attached to the initiation end 24 via the weld 66.

Figures 2A, 2B:
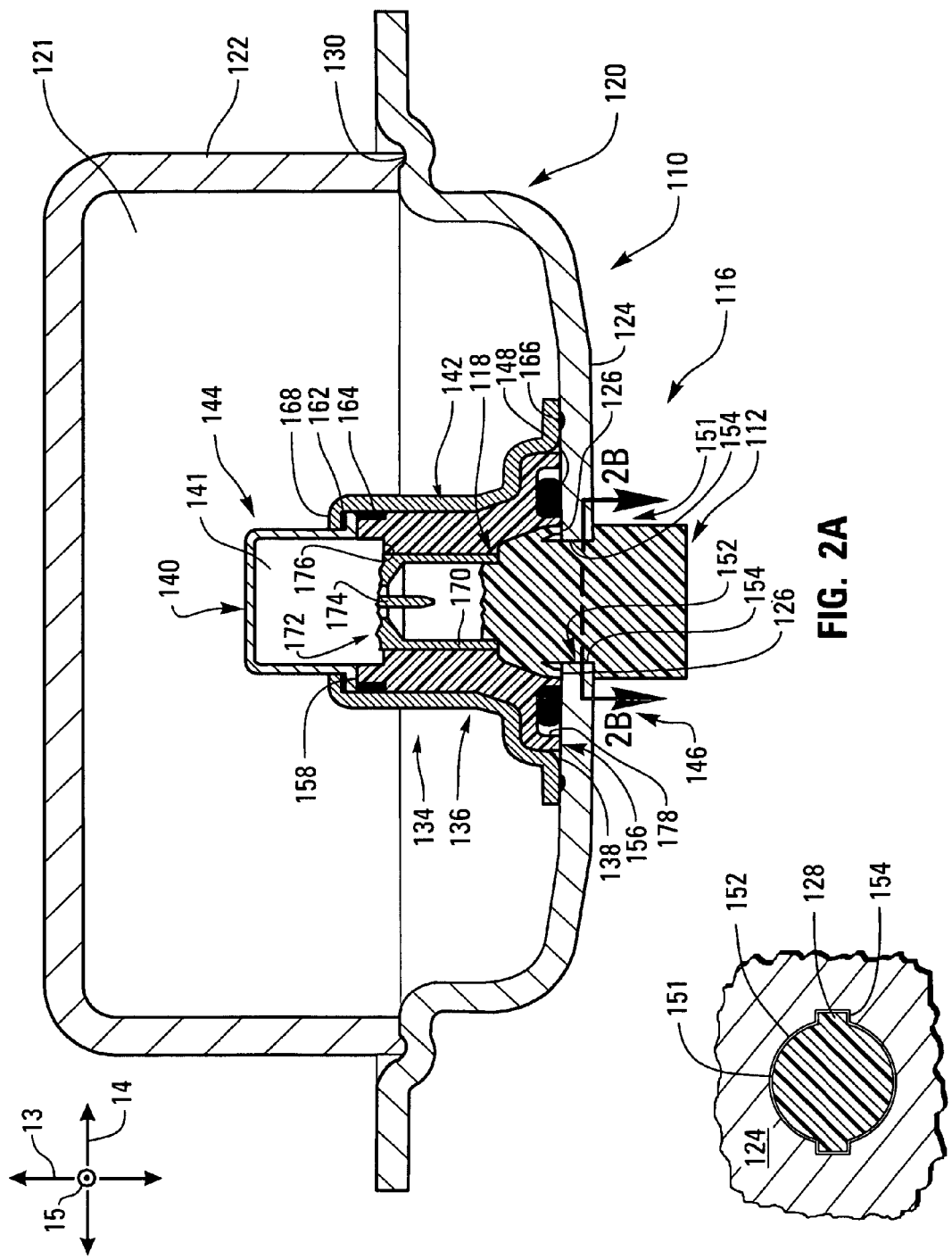
FIG. 2A is a side elevation, section view of an inflation assembly according to another alternative embodiment of the invention, with the connector connected to the inflator.
FIG. 2B is a sectional view of the inflation assembly of FIG. 2A taken at line 2B-2B of FIG. 2A, showing the connector extending into the housing.

Referring to FIG. 2A, a differently configured inflator 10 may be used in conjunction with the connector 12 to provide an inflation assembly 116 according to another alternative embodiment of the invention. The inflator 110 is also of a type that may be used for a driver's side, front impact airbag or the like. The inflator 110 has a housing 120 somewhat similar to the housing 20 of the previous embodiment. The housing 120 contains an initiation assembly 134. The initiation assembly 134 includes a receptacle 146 designed to receive the connector 112.

The receptacle 146 has a collar 136, which may be secured directly to an initiation end 124 of the housing 120. The collar 136 has an inside diameter 138, and the initiation end 124 of the housing 120 also has an inside diameter 152. A plurality of splines 154 are arrayed about the inside diameter 152 of the initiation end 124.

The receptacle 146 further includes an initiator 140, a body 142, and a cover 144 that attaches to the body 142 to generally encase the initiator 140. The body 142 has an outward shoulder 156 that abuts the initiation end 124 of the housing 120. An annular recess 178 is formed in the outward shoulder 156. The body 142 also has an inward shoulder 158 adjacent to the cover 144. The cover 144 has a rim 162 attached to the inward shoulder 158 via an ultrasonic weld 164. Unlike previous embodiments, the inward shoulder 158 has a substantially tubular shape. The rim 162 is shaped in a corresponding manner to receive the inward shoulder 158. The ultrasonic weld 164 is disposed on the outside diameter of the inward shoulder 158.

An o-ring 148 is positioned in the annular recess 178 of the outward shoulder 156. The collar 136 is attached to the initiation end 124 of the housing 120 via a weld 166 formed about the periphery of the collar 136. The weld 166 may not provide a gas tight seal between the initiation assembly 134 and the remainder of the interior of the inflator 110. Thus, positioning of the o-ring 148 in the annular recess 178 keeps gases from moving into or out of the interior of the inflator 110 through the gap between the connector 112 and the inside diameter 152 of the initiation end 124. The collar 136 has a lip 168 that retains the cover 144, and thence, the body 142 and the initiator 140.

The connector 112 may be installed in the receptacle 146 in a manner similar to that of the previous embodiment. More precisely, the shank 118 is inserted into the skirt 170 of the header eyelet 172 of the initiator 140 while the deflectable tabs 126 deflect to slide past the splines 154 of the initiation end 124. The splines 154 mesh with the ribs 128 of the connector 112 to permit the deflectable tabs 126 to slide clear of the splines 154 and return to a less deflected state. The deflectable tabs 126 prevent the connector 112 from being pulled from the receptacle 146 while the meshing of the splines 154 with the ribs 128 prevents relative post-assembly rotation of the connector 112 and the inflator 110.

The inflator 110 may be assembled in a variety of ways. According to one method, the initiation end 124 and the containment end 122 are formed by casting, stamping, or the like. If desired, the overall shape of the initiation end 124 may be formed by one process, and the splines 154 may be formed in the initiation end 124 through the use of a separate operation. The collar 136 may also be formed by stamping or the like. The lip 164 may be formed as part of the stamping operation or in a separate crimping operation.

The initiator 140 may be inserted into the body 142 and the cover 144 may be positioned and ultrasonically welded to the body 142 as described above. The o-ring 148 is inserted into the annular recess 178. The initiator 140, the body 142, the cover 144, and the o-ring 148 are inserted into the collar 136 until the rim 162 of the cover 144 abuts the lip 164 of the collar 136. The collar 136, the body 142, the cover 144, the initiator 140, and the o-ring 148 are then positioned with respect to the initiation end 124 and the collar 136 is attached to the interior surface of the initiation end 124 via the weld 166. The two ends 124, 122 of the housing 120 are attached together at the juncture 130 to enclose the generant (not shown).

FIG. 2B is a detail view of the inflator 110 of FIG. 2A taken at line 2B-2B placed in the initation end 124 of the housing 120 of the inflator 110. In FIG. 2B, a portion of the initiation end 124 of the inflator housing 120 is shown, the housing 120 including an orifice 151 having an inside diameter 152. This view of the initiation end 124 of the housing 120 illustrates the configuration of the orifice 151 and its relationship to the connector 112 placed therethrough. This relationship is not apparent in the view of FIG. 2A. More specifically, in FIG. 2B, the orifice 151 is shown to include splines 154 that interact with ribs 128 of the connector 112. AS discussed above with regard to FIG. 2A, when the connector 112 is passed through the orifice 151, it must be properly aligned such that the splines 154 are matched with ribs 128. In this orientation, the deflectable tabs 126 deflect when pressed against the splines 154. Once the tabs 126 have passed by the splines 154, they rebound to their less deflected state to secure the connector into place.

Although FIG. 2B illustrates an initiation end 124 of the housing 120 as including a single pair of symmetrical splines 154 that correspond with ribs 128 of the connector 112. One of ordinary skill in the art would understand that this configuration may be varied to include various numbers of splines 154 and ribs 128, including fewer (a single spline 154 and rib 128) and greater numbers. In operation, the inclusion of a spline 154 with a corresponding rib 128 prevents undesirable rotation of the connector 112 once it has been properly inserted into the housing 120.

Figure 3:
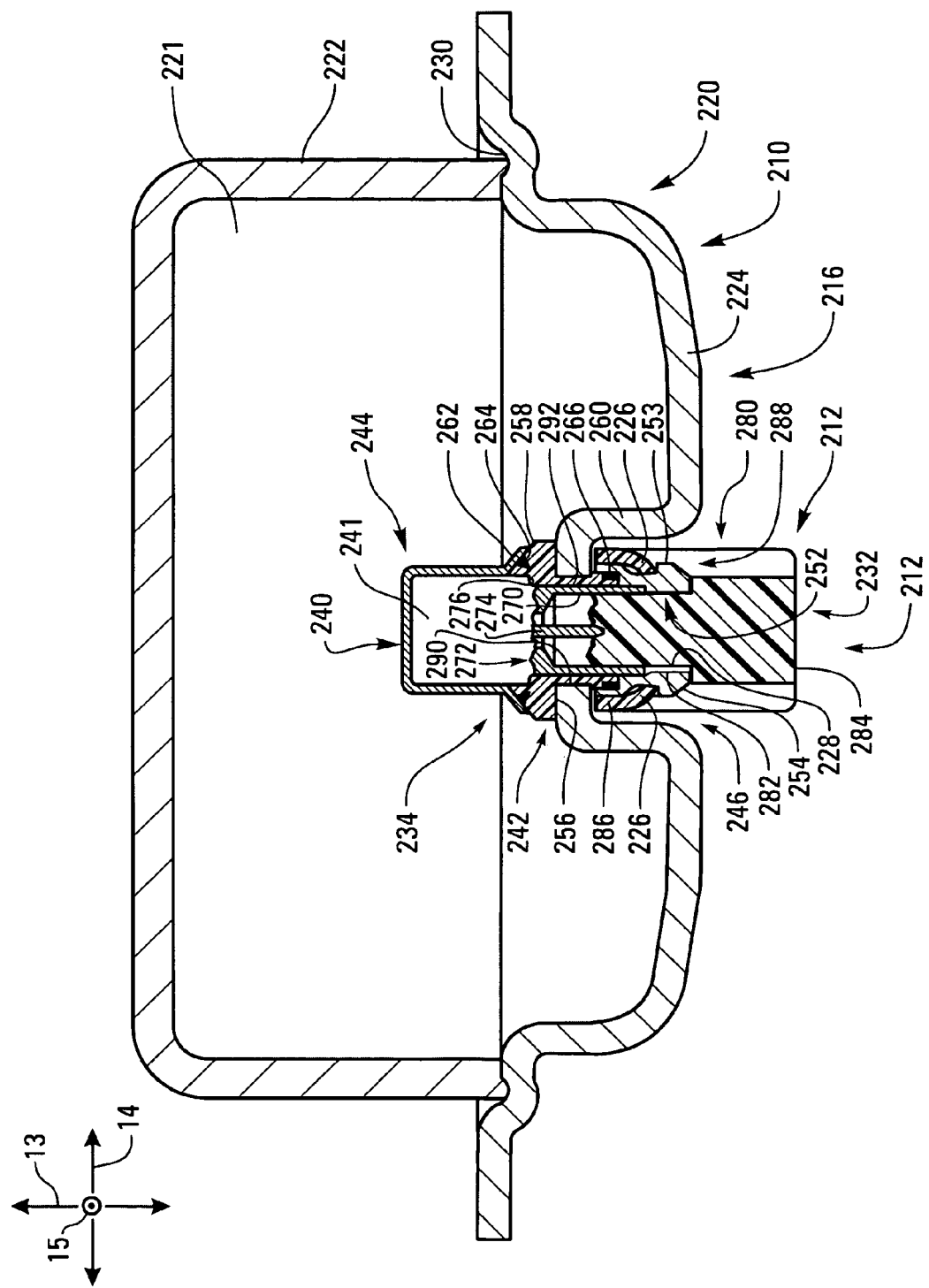
FIG. 3 is a side elevation, section view of an inflation assembly according to another alternative embodiment of the invention, with the connector connected to the inflator.

Referring next to FIG. 3, a differently configured inflator 210 may be used in conjunction with a connector 212 to provide an inflation assembly 216 according to another alternative embodiment of the invention. The connector 212 has a main body 232 in which a head 284 is formed, with a skirt 280 extending from the head 284. A shank 282 extends from the head 284 and from within the skirt 280. The skirt 280 has a distal ring 286 from which a pair of projections, or deflectable tabs 278, extends inward toward the shank 282.

As in the previous two embodiments, the inflator 210 is also of a type that may be used for a driver's side, front impact airbag or the like. The inflator 210 has a housing 220 somewhat similar to the housing 120 of the previous embodiment. The housing 220 contains an initiation assembly 234. The initiation assembly 234 includes a receptacle 246 designed to receive the connector 212.

The housing 220 has an initiation end 224 in which the initiation assembly 234 is generally disposed. Additionally, the housing 220 has a containment end 222. The containment end 222 meets the initiation end 224 at a junction 230. A socket 260 is formed in the initiation end 224 to receive and retain the initiation assembly 234.

The receptacle 246 has a retainer 288 similar to that of the embodiment of FIGS. 1-2. The retainer 288 has an inside diameter 252 and an outside diameter 253. The retainer 288 has a plurality of splines 254 arrayed about the outside diameter 253. The splines 254 are spaced in a manner that corresponds to the spacing of the ribs 228 to enable rotational locking, as described previously.

The receptacle 246 further includes an initiator 240, a body 242, and a cover 244 that attaches to the body 242 to generally encase the initiator 240. As in previous embodiments, the initiator 240 has a header eyelet 272, a center pin 274, a skirt 270, and shoulder 276. The body 242 has an outward shoulder 256 that abuts the initiation end 224 of the housing 220. The body 242 also has an inward shoulder 258 adjacent to the cover 244. The cover 244 has a rim 262 attached to the inward shoulder 258 via an ultrasonic weld 264. The body 242 has a skirt 292 to which the retainer 288 is attached via an ultrasonic weld 155. The skirt 292 is retained by a press fit portion 290 of the socket 260.

The connector 212 may be installed in the receptacle 246 in a relatively simple manner. More precisely, the shank 282 is inserted into the skirt 270 of the header eyelet 272 of the initiator 240 while the deflectable tabs 226 deflect to slide past the splines 254 of the retainer 288. The splines 254 mesh with the ribs 228 of the connector 212 to permit the deflectable tabs 226 to slide clear of the splines 254 and return to a less deflected state. The deflectable tabs 226 prevent the connector 212 from being pulled from the receptacle 246 while the meshing of the splines 254 with the ribs 228 prevents relative post-assembly rotation of the connector 212 and the inflator 210.

The inflator 210 may be assembled in a variety of ways. According to one method, the initiation end 224 and the containment end 222 are formed by casting, stamping, or the like. The initiator 240 may be inserted into the body 242 and the cover 244 may be positioned and ultrasonically welded to the body 242 as described above. The initiator 240, the body 242, and the cover 244 are urged into position with respect to the press fit portion 290 of the socket 260. The body 242, the cover 244, and the initiator 240 are then positioned with respect to the initiation end 224 and the retainer 288 is attached to the skirt 292 of the body 242 via the ultrasonic weld 155. The two ends 224, 222 of the housing 220 are attached together at the juncture 230 to enclose the generant (not shown).

Figure 4:
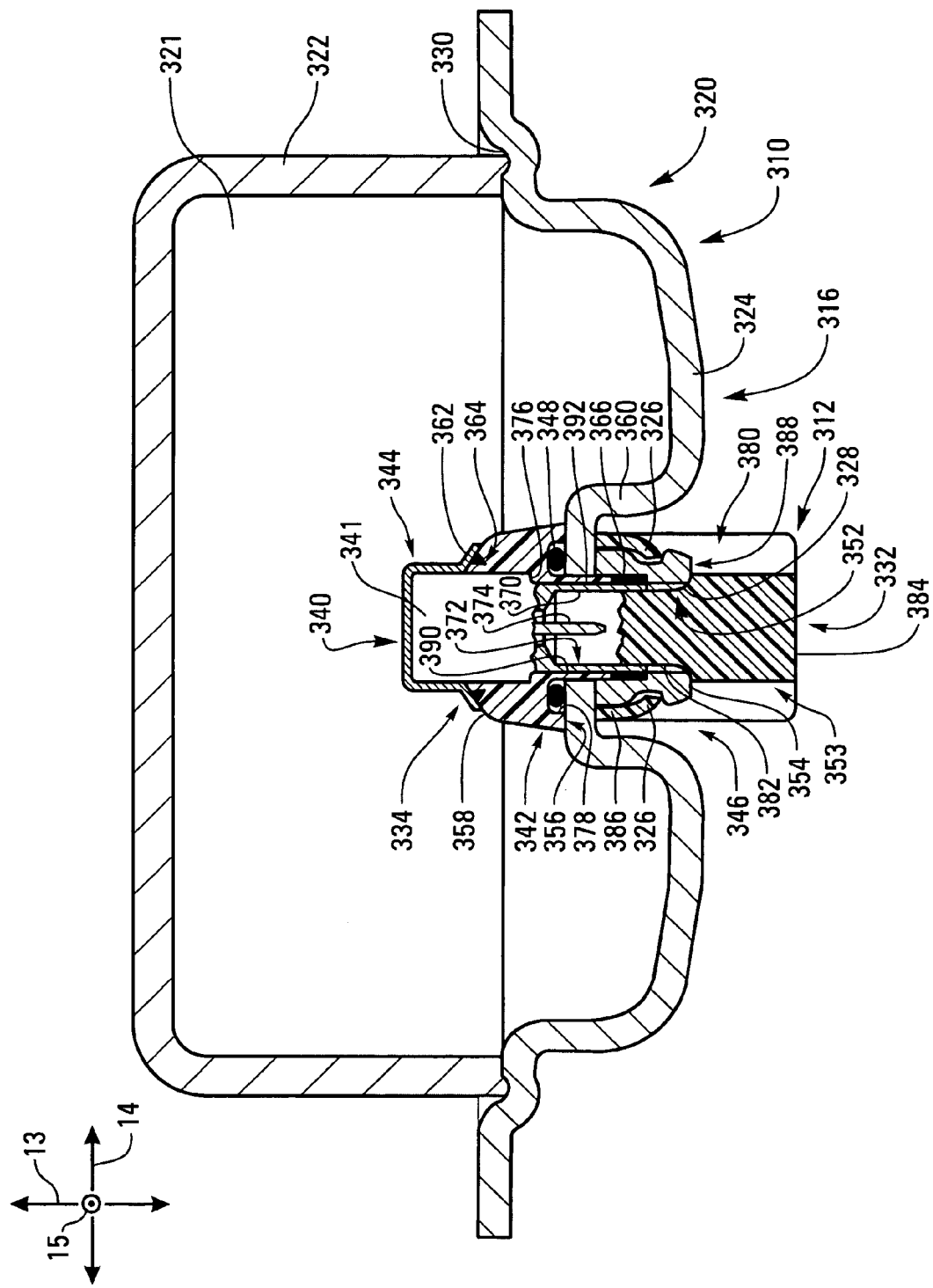
FIG. 4 is a side elevation, section view of an inflation assembly according to yet another alternative embodiment of the invention, with the connector connected to the inflator.

Referring to FIG. 4, a differently configured inflator 310 may be used in conjunction with a connector 312 similar to the connector 212 of FIG. 3 to provide an inflation assembly 316 according to another alternative embodiment of the invention. Again, the connector 312 has a main body 332 in which a head 384 is formed, with a skirt 380 extending from the head 384. A shank 382 extends from the head 384 and from within the skirt 380. The skirt 380 has a distal ring 386 from which a pair of projections, or deflectable tabs 326, extends inwardly toward the shank 382.

As in the previous three embodiments, the inflator 310 is also of a type that may be used for a driver's side, front impact airbag or the like. The inflator 310 has a housing 320 somewhat similar to the housing 220 of the previous embodiment. The housing 320 contains an initiation assembly 334. The initiation assembly 334 includes a receptacle 346 designed to receive the connector 326.

The housing 320 has an initiation end 324 in which the initiation assembly 334 is generally disposed. Additionally, the housing 320 has a containment end 322 like that of FIGS. 1-3. The containment end 322 meets the initiation end 324 at a junction 330. A socket 360 is formed in the initiation end 324 to receive and retain the initiation assembly 334. The socket 360 may be similar in shape, but slightly larger, than the socket 260 of the previous embodiment of FIG. 3.

The receptacle 346 has a retainer 388 similar to that of the embodiment of FIGS. 1-3. Again, the retainer 388 has an inside diameter 352 and an outside diameter 353. The retainer 388 has a plurality of splines 354 arrayed about the outside diameter 353. The splines 354 are spaced in a manner that corresponds to the spacing of the ribs 328 to enable rotational locking, as described previously.

The receptacle 346 further includes an initiator 340, a body 342, and a cover 344 that attaches to the body 342 to generally encase the initiator 340. As in previous embodiments, the initiator 340 has a header eyelet 372, a center pin 374, a skirt 370, and shoulder 376. The body 342 has a skirt 392 to which the retainer 388 is attached. The skirt 392 is retained by a press fit portion 390 of the socket 360. The body 342 has an outward shoulder 356 that abuts the socket 360 of the housing 320. An annular recess 378 is formed in the outward shoulder 356. The body 342 also has an inward shoulder 358 adjacent to the cover 344. The cover 344 may be similar to that illustrated in FIG. 3. Hence, the cover 344 has a rim 360 attached to the inward shoulder 358 via an ultrasonic weld 364.

An o-ring 348 is positioned in the annular recess 378 of the outward shoulder 356. The press fit of the skirt 392 within the press fit portion 390 of the socket 360 may not provide a gas tight seal between the initiation assembly 334 and the socket 360. Thus, positioning of the o-ring 348 in the annular recess 378 keeps gases from moving into or out of the interior of the inflator 310 between the skirt 392 and the press fit portion 390.

The connector 312 may be installed in the receptacle 346 in a manner similar to that of the embodiment of FIGS. 1-3. More precisely, the shank 382 is inserted into the skirt 370 of the header eyelet 372 of the initiator 340 while the deflectable tabs 326 deflect to slide past the splines 354 of the retainer 388. The splines 354 mesh with the ribs 328 of the connector 312 to permit the deflectable tabs 326 to slide clear of the splines 354 and return to a less deflected state. The deflectable tabs 326 prevent the connector 312 from being pulled from the receptacle 346 while the meshing of the splines 354 with the ribs 328 prevents relative post-assembly rotation of the connector 312 and the inflator 310.

The inflator 310 may be assembled in a variety of ways. According to one method, the initiation end 324 and the containment end 322 are formed by casting, stamping, or the like. The initiator 340 may be inserted into the body 342 and the cover 344 may be positioned and ultrasonically welded to the body 342 as described above. The o-ring 348 is disposed in the annular recess 378 of the outward shoulder 356 of the body 342. The initiator 340, the body 342, the cover 344, and the o-ring 348 are urged into position with respect to the press fit portion 390 of the socket 360. The body 342, the cover 344, and the initiator 340 are then positioned with respect to the initiation end 324 and the retainer 388 is attached to the skirt 392 of the body 342 via an ultrasonic weld 366. The two ends 324, 322 of the housing 320 are attached together at the juncture 330 to enclose the generant (not shown).

"Adaptive inflators" are inflators that produce variable volumes of gas in response to the severity of a collision. Some adaptive inflators have multiple initiators that must be individually actuable. Hence, separate connectors are used and must be connected properly to the initiators to ensure correct deployment.

Figure 5:
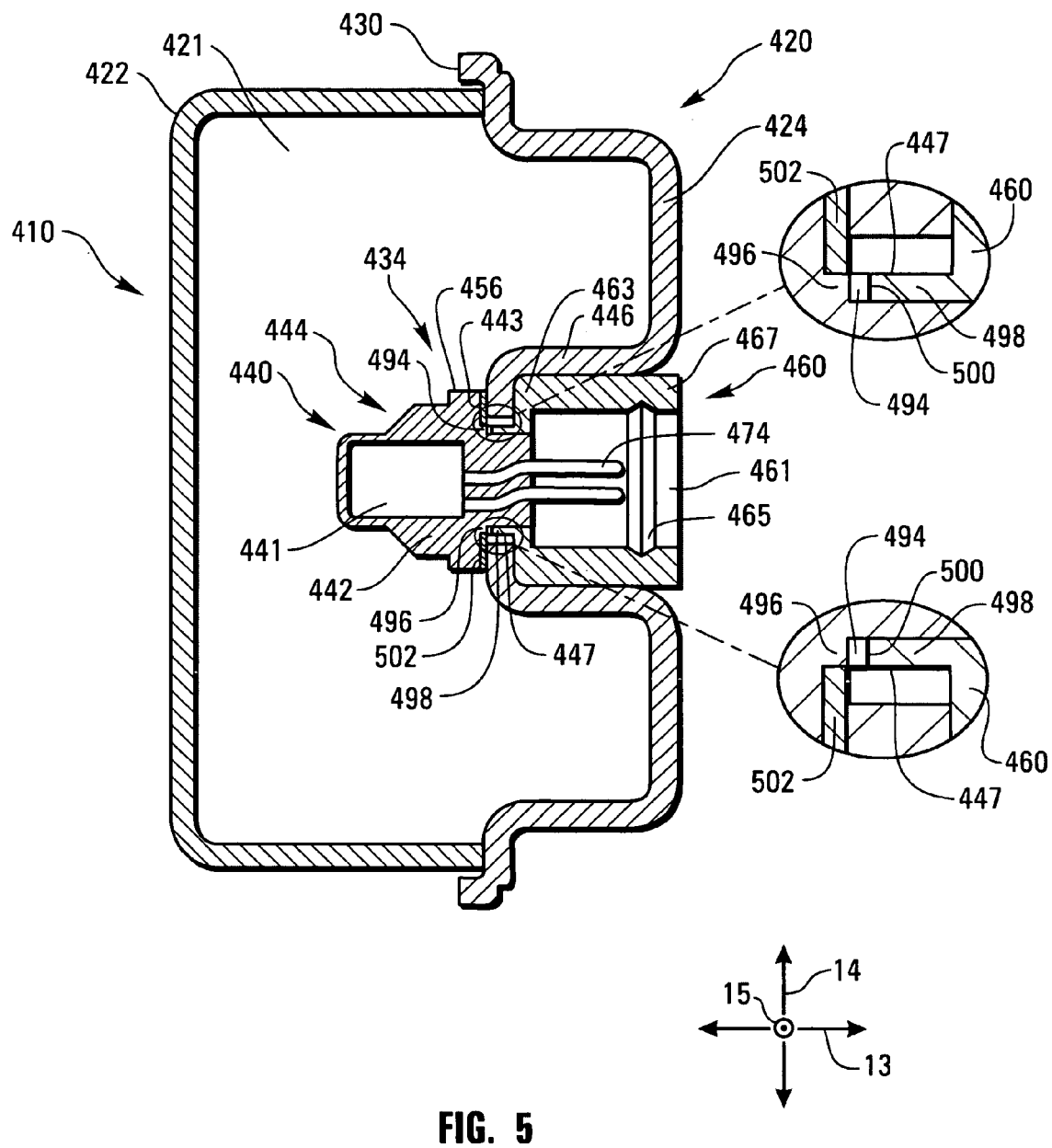
FIG. 5 is a side elevation, section view of an inflation assembly according to another alternative embodiment of the invention, with the connector attached to the initiator.

FIG. 5 illustrates yet another inflator 410 of the invention in a side elevation, section view. The inflator 410 includes an inflator housing 420 including a containment end 422 and an initiation end 424 defining a chamber 421 for housing a quantity of a material used as a gas generant (not shown). The initiation end 424 further includes an adaptor receptacle 446 adapted to receive an initiator adaptor socket 460 used to receive and retain an inflator connector (not shown) from a vehicle to link the airbag module to the electronics used to actuate the airbag module. The receptacle 446 includes an orifice 447 that passes completely through the initiator end 424. The inflator 410 further includes an initiator 440 used to initiate production of inflation gas for use in inflating an airbag cushion.

In the assembly of the inflator assembly 410, the adaptor socket 460 is placed within the receptacle 446. It is generally preferable that the adaptor socket 460 have a clearance fit within the receptacle 446. Still further, receptacles 446 may be provided having a size greater-than currently-used sockets 460, with sizing rings (not shown) being used to assure a secure fit of the socket 460 in the receptacle 446. Sizing rings could be produced using metal, elastomeric, plastic, or many other suitable materials known to one of ordinary skill in the art. Such rings could be produced to fit tightly about the socket 460 and add to its diameter such that it fits snugly within the receptacle 446.

The inflator 410 includes an initiation assembly 434. The initiation assembly 434 includes an initiator 440 that is a generally hollow-bodied structure having a cover 444 enclosing a chamber 441. The initiator 440 further includes a body 442 with a shoulder 456 that includes an interface surface 443 configured to contact a joint seal 502. The joint seal 502 is generally an elastomeric structure adapted to surround the orifice 447 of the receptacle 446. This permits an initiator interface skirt 500 and prongs 474 to extend from the initiator 440 downwardly through the orifice 447 and into the adaptor socket 460.

The adaptor socket 460 is a generally tubular structure configured to fit within the receptacle 446 of the inflator 410. The socket 460 includes a sleeve portion 467 adapted to receive an inflator connector (not shown), and a head portion 463. The sleeve portion 467 encloses a socket chamber 461 for the inflator connector. The sleeve portion may also include an adaptor ridge 465 to help anchor the inflator connector within the chamber 461, or to prevent incompatible connectors from use. The shape, depth, and configuration of the ridge 465 may be widely varied to permit use of shape, depth, configuration, etc., to be varied to accommodate use to retain a connector, or to code for appropriate connectors.

During assembly of the inflator 410, the initiator 440 is partially passed through the orifice 447 of the receptacle 446. The interface skirt 500 and the prongs 474 extend through the orifice 447, and are placed through a joint seal 502. The joint seal 502 may be placed either inside of the chamber 421 of the inflator 410, or outside of the chamber 421 within the receptacle 446. In either configuration, the joint seal 502 is held tightly between either the initiator 440 or the socket 460 and the receptacle 446. The socket 460 is passed upward into the receptacle 446 such that an upper surface of the adaptor socket 460 such as a welding sleeve 498 with an initiator interface 500 contacts a surface of the initiator 440 such as a contact or welding ridge 496 of the initiator 440. The interrelationship of these components is shown in the magnified views of the joint provided in FIG. 5.

These contacting surfaces are then welded using a vibratory welding technique such as ultrasonic welding to produce a weld 494 that holds the initiator 440 to the socket 460 tightly. This traps the seal 502 tightly against the receptacle 446, producing, in some configurations of the invention, a gas-tight seal.

Figure 6:
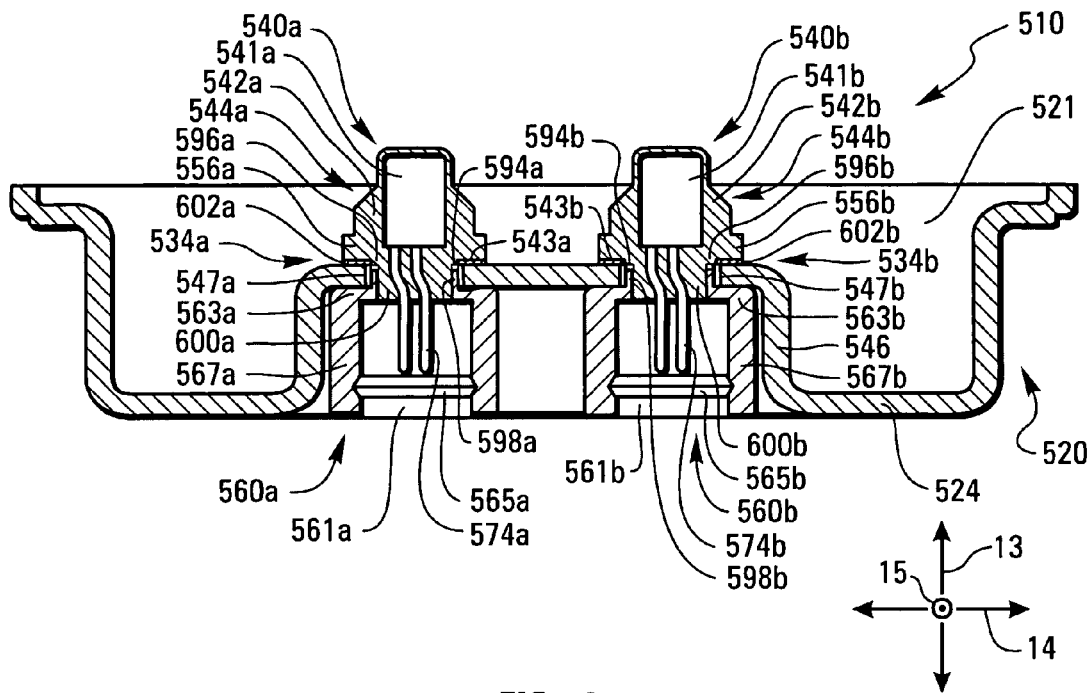
FIG. 6 is a side elevation, section view of an inflation assembly according to still another alternative embodiment of the invention, with a pair of individual connectors attached to a pair of initiators.

Referring next to FIG. 6, a side elevation, section view of another inflation assembly 510 according to invention is shown. In this embodiment of the inflation assemblies 510 of the invention, the inflator 510 includes a plurality of initiation assemblies, here assemblies 534a and 534b. This embodiment of the inflator 510 includes an inflator housing 520. In FIG. 6, only the initiation end 524 of the housing 520 is shown. The initiation end 524 further includes an adaptor receptacle 546 adapted to receive multiple initiator adaptor sockets 560a, 560b. As discussed above, these adaptor sockets 560a, 560b are used to receive and retain inflator connectors (not shown) from a vehicle to link the airbag module to the electronics used to actuate the airbag module.

The receptacle 546 includes a pair of orifices 547a, 547b which pass completely through the initiator end 524 of the inflator housing 520. As in FIG. 5, the inflation assembly 510 is shown in a side elevation, section view. As shown, the receptacle 546 may have a variety of shapes, here either an oval or circular configuration with orifices 547a, 547b placed therein. In circular or other larger configurations of the receptacle 546, it may be possible to add still more initiation assemblies 534a, 534b for a total of more than two if desired for a specific airbag inflator application. As illustrated in FIG. 6, however, the inflator 510 includes a pair of initiators 540a, 540b used to initiate production of inflation gas for use in inflating an airbag cushion.

During assembly of the inflator assembly 510, a pair of adaptor sockets 560a, 560b is placed within the receptacle

546. In this embodiment of the invention, the adaptor sockets 560a, 560b are placed loosely within the receptacle 546, and not sized to tightly fit within the receptacle 546. The sockets 560a, 560b are instead held in place largely by the welds 594a, 594b produced to attach the initiators 540a, 540b to the sockets 560a, 560b. Alternatively, the sockets 560a, 560b may be sized and shaped to combine to fill the receptacle 546 and thus to fit within the receptacle 546 in a secure manner. In still other alternative embodiments, the sockets 560a, 560b may be placed into a socket adaptor sized and configured to fit securely within the receptacle 546 and to receive the sockets 560a, 560b. Such adaptors or combined fits may reduce the potential for damage to the assembly 510 and the welds 594a, 594b produced during construction of the inflator 510 from vibration or shock to the assembly 510 that occurs as part of its ordinary daily use when installed in a vehicle.

Figure 7:
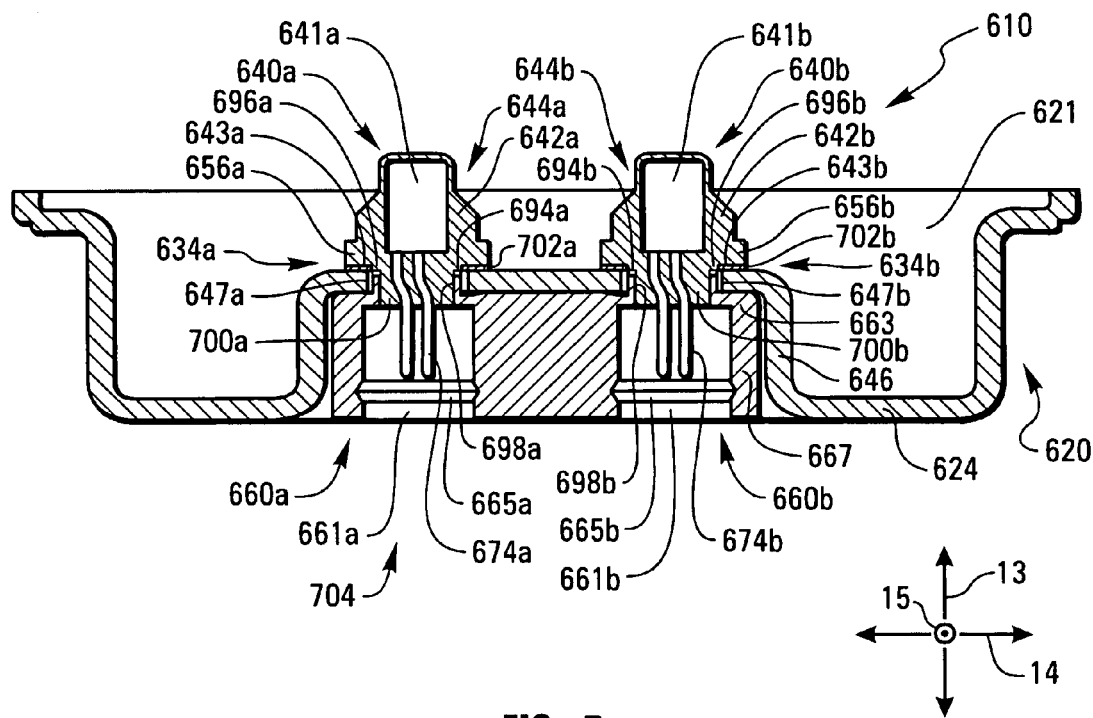
FIG. 7 is a side elevation, section view of an inflation assembly according to still another alternative embodiment of the invention, with a single unitary connector attached to a pair of initiators.

The inflator 510 thus includes a pair of initiation assemblies 534a, 534b. As described in previous embodiments, the initiation assemblies 534a, 534b include initiators 540a, 540b that are generally hollow-bodied structures having covers 544a, 544b enclosing chambers 541a, 541b. The initiators 540a, 540b further include bodies 542a, 542b with shoulders 556a, 556b that include interface surfaces 543a, 543b configured to contact joint seals 602a, 602b. As in FIG. 5 described above, the joint seals 602a, 602b are generally elastomeric structures adapted to surround the orifices 547a, 547b of the receptacle 546. This permits the initiator interface skirts 600a, 600b and prongs 574a, 574b to extend from the initiators 540a, 540b downwardly through the orifices 547a, 547b and into the adaptor sockets 560a, 560b. The joint seals 602a, 602b of FIGS. 6 and 7 are flattened rings. One of ordinary skill in the art would be able to adapt the designs illustrated to utilize O-rings or other suitable seals. In addition to the above, in the embodiment illustrated in FIG. 6, a single flat sheet of a material suitable to provide a seal may be provided in the place of the seals 602a, 602b. Such a sheet would include holes placed to correspond to the orifices 547a, 547b and thus function in a similar fashion.

The adaptor sockets 560a, 560b of FIG. 6 are similar to those disclosed in FIG. 5 in that they are generally tubular structures configured to fit within the receptacle 546 of the inflator 510. As briefly noted above, however, the sockets 560a, 560b of FIG. 6 are not illustrated to fill the receptacle 546. The sockets 560a, 560b include sleeve portions 567a, 567b adapted to receive inflator connectors (not shown), and head portions 563a, 563b. The sleeve portions 567a, 567b enclose socket chambers 561a, 561b for the inflator connector. The sleeve portions may also include adaptor ridges 565a, 565b to help anchor the inflator connector within the chambers 561a, 561b, or to prevent the use of incompatible connectors. The shape, depth, and configuration of the ridges 565a, 565b may be widely varied to permit use of shape, depth, configuration, etc., to be varied to accommodate use to retain a connector, or to code for appropriate connectors.

During assembly of the inflator 510, the initiators 540a, 540b are partially passed through the orifices 547a, 547b of the receptacle 546. The interface skirts 600a, 600b and the prongs 574a, 574b extend through the orifices 547a, 547b, and are placed through the joint seals 602a, 602b. The joint seals 602a, 602b may be placed either inside of the chamber 521 of the inflator 510, or outside of the chamber 521 within the receptacle 546. In either configuration, the joint seals 602a, 602b are held tightly between either the initiators 540a, 540b or the sockets 560a, 560b and the receptacle 546. Each socket 560a, 560b is passed upward into the receptacle 546 such that an upper surface of the adaptor sockets 560a, 560b such as welding sleeves 598a, 598b with initiator interfaces 600a, 600b contacts a surface of the initiator 540a, 540b such as a contact or welding ridge 596a, 596b of the initiator 540a, 540b.

These contacting surfaces are then welded using a welding technique such as ultrasonic welding to produce welds 594a, 594b that hold the initiators 540a, 540b to the sockets 560a, 560b tightly. This traps the seals 602a, 602b tightly against the receptacle 546, producing, in some configurations of the invention, a gas-tight seal.

FIG. 7 provides a side elevation, section view of an inflation assembly 610 according to still another alternative embodiment of the invention, similar to that of FIG. 6. The inflator 610 is similar to the inflator 510 of FIG. 6 in that it is adapted to receive a plurality of initiation assemblies 634a, 634b. As with the inflator 510 of FIG. 6, the inflator 610 of FIG. 7 is shown to include only two such initiation assemblies 634a, 634b, but could readily be adapted to include more such assemblies. In this inflator 610, however, the initiators 640a, 640b are welded to a single, unitary socket 704. This socket 704 includes first and second socket portions 660a, 660b used to receive and retain inflator connectors (not shown) from a vehicle to link the airbag module to the electronics used to actuate the airbag module.

As above, the receptacle 646 includes a number of orifices 647a, 647b which pass completely through the initiator end 624 of the inflator housing 620 into the chamber 621. As in FIG. 6, the inflation assembly 610 is shown in a side elevation, section view. As shown, the receptacle 646 may have a variety of shapes, here either an oval or circular configuration with orifices 647a, 647b placed therein. In circular or other larger configurations of the receptacle 646, it may be possible to add still more initiation assemblies 634a, 634b for a total of more than two if desired for a specific airbag inflator application. As illustrated in FIG. 7, however, the inflator 610 includes a pair of initiators 640a, 640b used to initiate production of inflation gas for use in inflating an airbag cushion.

As described above, during assembly of the inflator assembly 610, the adaptor socket 704 is placed within the receptacle 646. In this embodiment of the invention, the adaptor socket 704 includes first and second socket portions 660a, 660b which are adapted to receive portions of the initiators 640a, 640b. The socket 704 may be sized to have a clearance or press-fit within the receptacle 646, may be held within the receptacle 646 by an adhesive, fastener, or other similar means; or it may be held within the receptacle 646 by the welds 694a, 694b formed between the initiators 640a, 640b and the socket 704 alone. A clearance fit generally provides a socket 704 having a size only slightly smaller than the interior space of the receptacle 646, in which the socket 704 fits within the receptacle 646. Alternatively, a press-fit may be used in which the socket 704 and the receptacle 646 are of sufficiently similar size such that some force may be used to insert the socket 704 into the receptacle 646, and potentially in which the receptacle 646 must deform at least slightly to accept and retain the socket 704.

The use of such sockets 704 that fit at least somewhat snugly within the receptacle 646 may reduce the potential for damage to the assembly 610 and the welds 694a, 694b produced during construction of the inflator 610 caused by vibration or shock that occurs as part of its ordinary daily use when installed in a vehicle.

The inflator 610 thus includes a pair of initiation assemblies 634a, 634b. As described in previous embodiments, the initiators 640a, 640b are generally hollow-bodied structures having covers 644a, 644b enclosing chambers 641a, 641b. The initiators 640a, 640b further include bodies 642a, 642b with shoulders 656a, 656b that include interface surfaces 643a, 643b configured to contact joint seals 702a, 702b. As in the embodiments of the invention described above, the joint seals 702a, 702b are generally elastomeric structures adapted to surround the orifices 647a, 647b of the receptacle 646. This permits the initiator interface skirts 700a, 700b and prongs 674a, 674b to extend from the initiators 640a, 640b downwardly through the orifices 647a, 647b and into the first and second socket portions 660a, 660b.

The joint seals 702a, 702b of FIGS. 5, 6, and 7 are illustrated as flattened rings. One of ordinary skill in the art would be able to adapt the designs illustrated to utilize o-rings or other suitable seals. As with the embodiment illustrated in FIG. 6, a single flat sheet of a material suitable to provide a seal may be provided in the place of the seals 702a, 702b of FIG. 7. Such a sheet would include holes placed to correspond to the orifices 647a, 647b and thus function in a similar fashion.

The first and second socket portions 660a, 660b of FIG. 7 are similar to those disclosed in FIG. 5 in that they are generally tubular structures including a shared sleeve portion 667 that are adapted to receive inflator connectors (not shown). The socket 704 further includes head portions 663. The sleeve portion 667 encloses socket chambers 661a, 661b for the inflator connectors. The sleeve portion 667 may also include adaptor ridges 665a, 665b to help anchor the inflator connector within the chambers 661a, 661b, or to prevent the use of incompatible connectors. The shape, depth, and configuration of the ridges 665a, 665b may be widely varied to permit use of shape, depth, configuration, etc., to be varied to accommodate use to retain a connector, or to code for appropriate connectors.

During assembly of the inflator 610, the initiators 640a, 640b are partially passed through the orifices 647a, 647b of the receptacle 646. The interface skirts 700a, 700b and the prongs 674a, 674b extend through the orifices 647a, 647b, and are placed through the joint seals 702a, 702b. The joint seals 702a, 702b may be placed either inside of the chamber 621 of the inflator 610, or outside of the chamber 621 within the receptacle 646. In either configuration, the joint seals 702a, 702b are held tightly between either the initiators 640a, 640b or the sockets 660a, 660b and the receptacle 646. Each socket 660a, 660b is passed upward into the receptacle 646 such that an upper surface of the adaptor sockets 660a, 660b such as welding sleeves 698a, 698b with initiator interfaces 700a, 700b contacts a surface of the initiator 640a, 640b such as a contact or welding ridge 696a, 696b of the initiator 640a, 640b.

These contacting surfaces are then welded using a welding technique such as ultrasonic welding to produce welds 694a, 694b that hold the initiators 640a, 640b to the socket 704 tightly. This traps the seals 702a, 702b tightly against the receptacle 646, producing, in some configurations of the invention, a gas-tight seal.

Figure 8:
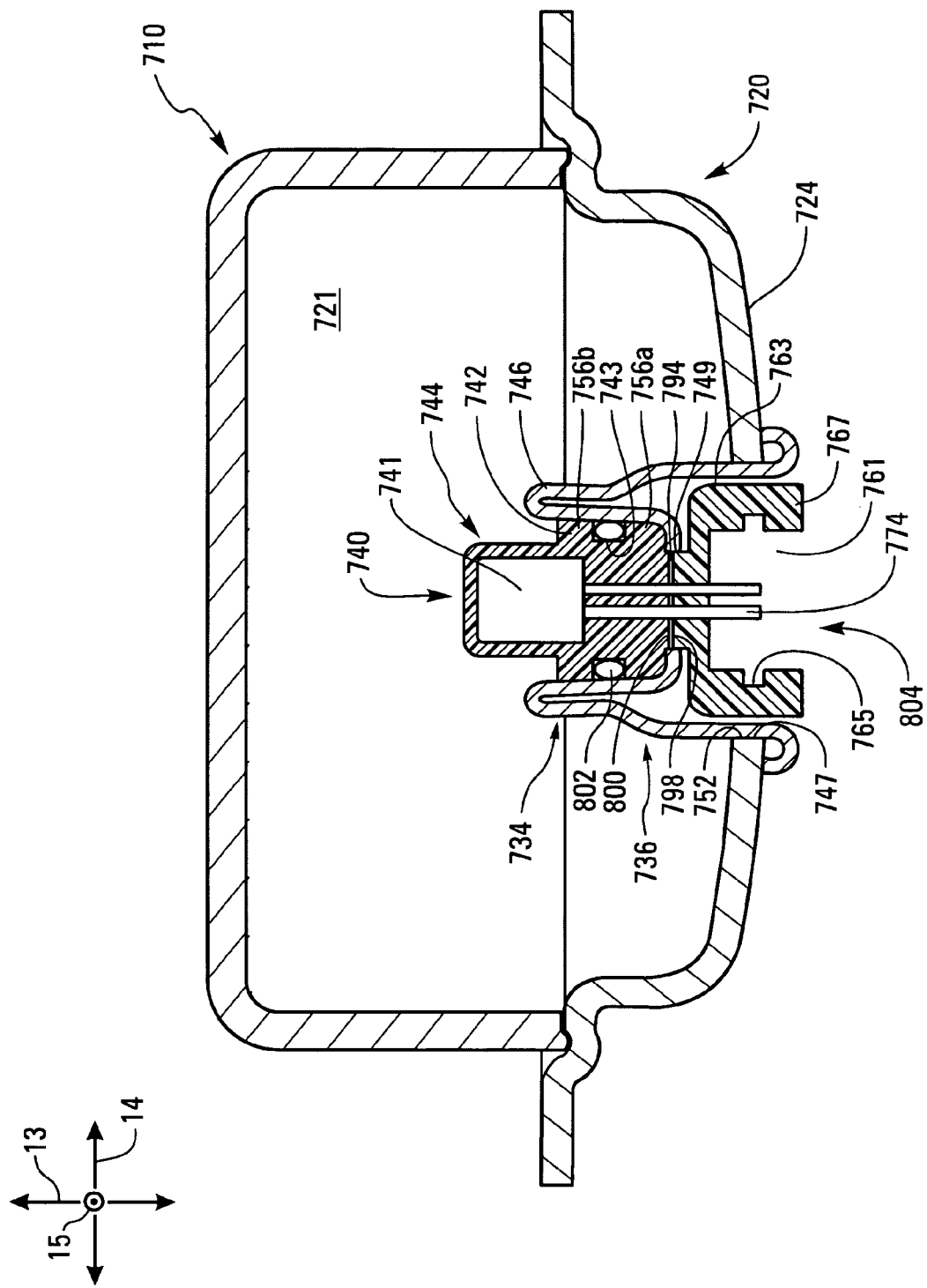
FIG. 8 is a side elevation, section view of an inflation assembly according to yet another alternative embodiment of the invention, the inflation assembly utilizing a modular receptacle to receive and retain the initiator and socket in place within an inflator.

FIG. 8 provides a side elevation, section view of yet another inflation assembly 710 according an alternative embodiment of the invention. In this inflation assembly 710, an initiation assembly 734 is welded into place within a receptacle 746. Although the inflation assembly 710 illustrated in FIG. 8 includes only a single initiation assembly 734, it may be adapted by one of ordinary skill in the art to be similar to the inflation assemblies 510, 610 illustrated in FIGS. 6 and 7 in which multiple initiation assemblies were integrated into a single inflation assembly 510, 610. Although the inflators 510 and 610 of FIGS. 6 and 7 include only two such initiation assemblies 534a, 534b, 634a, 634b, but could readily be adapted to include more such assemblies.

The inflation assembly 710 of FIG. 8 differs from those previously taught herein in that the receptacle 746 is a separate component installed into the housing 720 of the inflation assembly 710. The receptacle 746 is placed into an orifice 747 found in the initiator end 724 of the inflator housing 720. In some embodiments of the inflation assembly 710, the orifice 747 may be larger than those provided in previously-discussed embodiments since the orifice 747 of FIG. 8 must accommodate the entire receptacle 746, while in other embodiments, the orifice is often made in the receptacle and is only needed to accommodate portions of the initiator itself. Thus, in the inflation assembly 710 of FIG. 8, the orifice 747 is sized to accommodate the receptacle 746.

The receptacle 746 may be held in place within the orifice 747 by a variety of techniques, including sizing the receptacle 746 and orifice 747 such that a press-fit is obtained, or configuring the receptacle 746 such that it snaps into place or locks into place using a variety of mechanical techniques known to one of ordinary skill in the art. In still other embodiments, the receptacle 746 may be welded into place using traditional techniques or other welding techniques such as ultrasonic welding aught herein.

The receptacle 746 serves as an adapter for the initiation assembly 734, acting to hold it in place within the inflator 710. The initiation assembly 734 includes a socket 804 used to receive and retain an inflator connector (not shown) from a vehicle to link the airbag module to the electronics used to actuate the airbag module that are found in the vehicle. The receptacle 746 includes an orifice 749 that is lesser in size than the orifice 747 of the initiation end 724 of the inflator housing 720. This orifice 749 opens the chamber 721 of the inflator 710 to the outside before an initiator assembly 734 is installed.

The inflation assembly 710 of FIG. 8 may be assembled by attaching the receptacle 746 described above to the initiation end 724 of the housing 720 as discussed above and uniting the initiator 140 with the socket 804 through the receptacle 746. In some embodiments it may be desirable to attach the initiator 140 to the socket 804 prior to attaching the receptacle 746 to the inflator assembly housing 720. Alternatively, the receptacle 746 may first be attached to the inflator assembly housing 720, following which the initiator 740 is attached to the socket 804.

According to the methods of the present invention, during assembly of the inflator assembly 710, the adapter socket 804 is placed within the receptacle 746. In this embodiment of the initiation assemblies of the present invention, the adapter socket 804 is sized to fit within the externally-facing portion of the receptacle 476. In some instances, it may be desirable to size the adapter socket 804 to have a clearance or press-fit within the receptacle 746. In others, the socket 804 may be held within the receptacle 746 by an adhesive, fastener, or other similar means. In some embodiments, however, the socket 804 may simply be placed within the receptacle 746 and held in place by its attachment to the initiator 740 via a weld 794 formed between the initiator 740 and the socket 804 alone.

A clearance fit scenario generally provides a socket 804 having a size only slightly smaller than the interior space of the receptacle 746, in which the socket 804 is sized to fit within the receptacle 746. Alternatively, a press-fit may be used in which the socket 804 and the receptacle 746 are of sufficiently similar size such that some force may be required to insert the socket 804 into the receptacle 746, and potentially in which the receptacle 746 must deform at least slightly to accept and retain the socket 804.

The use of such sockets 704 that fit at least somewhat snugly within the receptacle 746 may reduce the potential for damage to the assembly 710 and the weld 794. Such damage may occur as a result of the vibration or shock that occurs as part of the ordinary daily use of the initiator when installed in a vehicle.

The inflator 710 thus includes an initiation assembly 734 including an initiator 740. As described in previous embodiments, the initiator 740 is a generally hollow-bodied structure having a covers 744 that encloses a chamber 741 adapted to contain a material used to initiate the inflator assembly 710. The initiator 740 further includes a body 742 having lower and upper shoulders 756a, 756b. Shoulders 756a, 756b abut a wall of the receptacle 746, and encompass a seal groove 743 that is here illustrated as a channel formed between the two shoulders 756a, 756b. According to the present invention, the channel 743 is used to accommodate a joint seal 802, illustrated in FIG. 8 to have the form of an O-ring used to seal the interior chamber 721 of the inflator apparatus 710 from the outer environment. As in the embodiments of the invention described above, the joint seal 802 is generally an elastomeric structure adapted to form a seal between the receptacle 746 and the initiator 740 by filling space between the receptacle 746 and the initiator 740. This prevents escape of gases from the inflator apparatus 710.

The shoulder 756a also includes an initiator interface 800. When the initiator 740 is inserted into the receptacle 746 and ultrasonically welded to the socket 804, the initiator interface 800 of the initiator 740 forms a weld 794 with the contact or welding interface of the socket 804. As discussed briefly above, this weld 794 may be used to attach the socket 804 to the assembly 734.

In alternative embodiments of the invention, additional joint seals may be placed to assure a seal at the joint between the initiator 740 and the socket 804. Such joint seals (not shown) may be placed at any point between the initiator 740 and the receptacle 746. Such seals could also be placed between the socket 804 and the receptacle 746. One of ordinary skill in the art would be able to adapt the designs illustrated to utilize flattened rings, o-rings, gaskets, or other suitable seals.

The socket 804 illustrated in FIG. 8 is similar to those disclosed in earlier figures, in that it is a substantially tubular structure having a sleeve portion 767 adapted to receive inflator connectors 774. The socket 804 further includes a head portion 763. The sleeve portion 767 encloses a socket chamber 761 adapted to receive inflator connectors (not shown) extending from the vehicle to the inflation apparatus 710. As illustrated in FIG. 8, the sleeve portion 767 may also include an adapter ridge 765 to help anchor the inflator connector within the chambers 661, and also to prevent the use of incompatible connectors. The shape, depth, and configuration of the ridge 765 may be widely varied to permit use of these characteristics as variable features that may be used to retain a connector securely, or to code for appropriate connectors and prevent use of inappropriate connectors.

During assembly of the inflator apparatus 710, the initiator 740 is partially passed through the orifice 749 of the receptacle 746. The interface surface 800 of the initiator 740 and the prongs 774 extend through the orifice 749, and thus travel through the joint seal 802. As discussed above and known to one of ordinary skill in the art, the joint seal 802 may be placed either inside of the chamber 721 of the inflator 710, or outside of the chamber 721 within the receptacle 746. In either configuration, the joint seal 802 is held tightly between either the initiator 740 or the socket 804 and the receptacle 746. The socket 804 is passed upward into the receptacle 746 such that an upper surface of the adaptor socket 804 such as the interface 798 contacts a surface of the initiator 740 such as a contact or welding ridge 796. Subsequently, techniques taught herein may be used to produce an ultrasonic weld between the initiator 740 and the socket 804 to hold them together and thus link the initiation assembly 734 to the inflation assembly 710. This also draws the joint seal 802 tightly into place to create a gas-tight seal between the interior chamber 721 of the inflation apparatus 710 and the outside.

The initiation assemblies provided by the present invention are not limited in application to airbags. Rather, the systems and methods of the invention may be used in conjunction with a variety of pyrotechnic devices such as explosives, flares, visual effects, and the like. The various embodiments illustrated above may readily be adapted to such applications through the use of knowledge available in the art.

Through the use of the present invention, inflators may be more simply and inexpensively manufactured due to a reduction in the number of parts and/or labor intensive manufacturing steps. Furthermore, the electrical connections of an airbag module according to the invention may be easily and rapidly assembled without adversely impacting the reliability and integrity of the airbag system.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator for an airbag cushion comprising:
   an inflator housing base having an upper and a lower surface oriented opposite each other and an initiator opening;
   a joint seal placed about the initiator opening against either the upper or the lower surface of the inflator housing base;
   an initiator passed through the initiator opening from either the upper or the lower surface of the inflator housing base; and
   an adaptor socket configured to receive an inflator adaptor, the socket being secured to the initiator through the initiator opening either the upper or the lower surface of the inflator housing base opposite the first surface.

2. The inflator of claim 1, wherein the socket is secured to the initiator by ultrasonic welding.

3. The inflator of claim 2, wherein the initiator further includes a welding ridge configured to extend from the initiator and contact the adaptor socket during assembly of the inflator.

4. The inflator of claim 3, wherein the welding ridge and an upper surface of the socket form a weld during assembly of the inflator.

5. The inflator of claim 2, wherein the joint seal is selected from the group consisting of: O-rings washers, and gaskets.

6. The inflator of claim 1, wherein the adaptor socket is secured to the initiator in such a manner as to seal the inflator opening in a gas tight manner.

7. The inflator of claim 1, further comprising a second initiator opening, joint seal, initiator, and adaptor socket.

8. The inflator of claim 2, further comprising at least two initiator openings, joint seals, initiators, and adaptor sockets, each additional socket being secured to the second initiator by ultrasonic welding.

9. The inflator of claim 8, wherein the adaptor sockets are separate individual components.

10. The inflator of claim 8, wherein the adaptor sockets are portions of a single socket plate.

11. An inflator for inflating an airbag cushion comprising:
an inflator housing configured to retain a quantity of a gas generant, the inflator housing including an initiator receptacle with an orifice;
a ring-shaped joint seal having a seal orifice, the joint seal being placed on an upper or lower face of the inflator housing such that the seal orifice is aligned with the orifice of the initiator receptacle;
an initiator having a connector passed through the orifice of the initiator receptacle of the inflator housing; and
an adaptor socket configured to pass at least partially through the orifice and contact the initiator, either the initiator or the adapter socket being passed through the seal orifice of the joint seal, wherein the inflator is assembled by an ultrasonic weld linking the initiator to the adaptor socket through the orifice of the initiator receptacle of the inflator housing such that the joint seal is secured against the face of the inflator housing.

12. The inflator of claim 11, wherein the initiator further includes a welding ridge configured to extend from the initiator and contact the adaptor socket during assembly of the inflator.

13. The inflator of claim 12, wherein the welding ridge and an upper surface of the socket form the ultrasonic weld.

14. The inflator of claim 11, wherein the adaptor socket is secured to the initiator in such a manner as to seal the orifice in a gas tight manner.

15. The inflator of claim 11 further comprising a second initiator receptacle and orifice, a second joint seal, a second initiator, and a second adaptor socket, the second initiator being linked to the second adaptor socket by an ultrasonic weld.

16. The inflator of claim 15, wherein the first and second adaptor sockets are portions of a single socket plate.

17. The inflator of claim 11, wherein the initiator receptacle is a separate component independently joined to the inflator housing.

18. An inflator for inflating an airbag cushion comprising:
an inflator housing configured to retain a quantity of a gas generant, the inflator housing including an initiator receptacle with an orifice;
a ring-shaped joint seal having a seal orifice, the joint seal being placed on at least one face of the inflator housing such that the seal orifice is aligned with the orifice of the initiator receptacle;
an initiator having a connector passed through the orifice of the initiator receptacle of the inflator housing, the inflator further including a welding ridge; and
an adaptor socket configured to pass at least partially through the orifice and contact the welding ridge of the initiator, wherein the inflator is assembled by an ultrasonic weld linking the initiator to the adaptor socket through the orifice of the initiator receptacle of the inflator housing such that the joint seal is secured against the face of the inflator housing.

19. The inflator of claim 18, wherein the initiator receptacle is a component separate from the inflator housing sized to accommodate the initiator on an internal face, and size to accommodate the socket on an external face.

20. The inflator of claim 18, comprising at least two sets of initiators and corresponding sockets.

* * * * *

UNITED STATES PATENT AND TRADEMARK OFFICE
CERTIFICATE OF CORRECTION

PATENT NO. : 7,401,810 B2
APPLICATION NO. : 11/041808
DATED : July 22, 2008
INVENTOR(S) : Dario G. Brisighella, Jr. et al.

It is certified that error appears in the above-identified patent and that said Letters Patent is hereby corrected as shown below:

On the cover page replace item 57 ABSTRACT line 7 "inflator using an ultrasound welding process" with --inflator using an ultrasonic welding process--

On the cover page add the following references to item 56 REFERENCES CITED, which were included in the Information Disclosure Statement filed by Applicant on January 24, 2005:

U.S. PATENT DOCUMENTS

| | | |
|---|---|---|
| 3,971,320 | 7/1976 | Lee |
| 4,690,063 | 9/1987 | Granier et al. |
| 5,241,910 | 9/1993 | Cunningham et al. |
| 5,314,345 | 5/1994 | Cahaly et al. |
| 5,404,263 | 4/1995 | Graves |
| 5,454,320 | 10/1995 | Hilden et al. |
| 5,531,474 | 7/1996 | Osborne et al. |
| 5,686,691 | 11/1997 | Hamilton et al. |
| 6,056,314 | 5/2000 | Shirk et al. |
| 6,146,598 | 11/2000 | Duvacquier et al. |
| 6,189,924 B1 | 2/2001 | Hock |
| 2002/0062757 A1 | 5/2002 | Vetter |
| 2002/0158455 A1 | 10/2002 | Bergerson et al. |

FOREIGN PATENT DOCUMENTS

| | | |
|---|---|---|
| WO | 95/11421 | 4/1995 |
| EP | 0 803 700 B1 | 10/1997 |
| EP | 0 943 503 A2 | 9/1999 |
| EP | 1 139 060 B1 | 10/2001 |
| EP | 1 323 596 A1 | 7/2003 |

In column 20, line 23, please replace "receptacle 746 serves as an adapter for" with --receptacle 746 serves as an adaptor for--

In column 20, line 26, please replace "the adapter socket 804" with --the adaptor socket 804--

UNITED STATES PATENT AND TRADEMARK OFFICE
CERTIFICATE OF CORRECTION

PATENT NO. : 7,401,810 B2
APPLICATION NO. : 11/041808
DATED : July 22, 2008
INVENTOR(S) : Dario G. Brisighella, Jr. et al.

It is certified that error appears in the above-identified patent and that said Letters Patent is hereby corrected as shown below:

In column 20, line 48, please replace "present invention, the adapter" with --present invention, the adaptor--

In column 20, line 51, please replace "to size the adapter socket 804" with --to size the adaptor socket 804--

In column 21, line 50, please replace "an adapter ridge 765" with --an adaptor ridge 765--

In claim 1, line 13, please replace "initiator opening either" with --initiator opening from either--

In claim 5, line 2, please replace "O-rings washers, and gaskets" with --O-rings, washers, and gaskets--

In claim 11, line 13, please replace "initiator or adapter socket" with --initiator or adaptor socket--

In claim 19, line 3, please replace "internal face, and size to" with --internal face, and sized to--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,401,810 B2
APPLICATION NO. : 11/041808
DATED : July 22, 2008
INVENTOR(S) : Dario G. Brisighella, Jr. et al.

It is certified that error appears in the above-identified patent and that said Letters Patent is hereby corrected as shown below:

On the cover page replace item 57 ABSTRACT line 7 "inflator using an ultrasound welding process" with --inflator using an ultrasonic welding process--

On the cover page add the following references to item 56 REFERENCES CITED, which were included in the Information Disclosure Statement filed by Applicant on January 24, 2005:

U.S. PATENT DOCUMENTS

| | | |
|---|---|---|
| 3,971,320 | 7/1976 | Lee |
| 4,690,063 | 9/1987 | Granier et al. |
| 5,241,910 | 9/1993 | Cunningham et al. |
| 5,314,345 | 5/1994 | Cahaly et al. |
| 5,404,263 | 4/1995 | Graves |
| 5,454,320 | 10/1995 | Hilden et al. |
| 5,531,474 | 7/1996 | Osborne et al. |
| 5,686,691 | 11/1997 | Hamilton et al. |
| 6,056,314 | 5/2000 | Shirk et al. |
| 6,146,598 | 11/2000 | Duvacquier et al. |
| 6,189,924 B1 | 2/2001 | Hock |
| 2002/0062757 A1 | 5/2002 | Vetter |
| 2002/0158455 A1 | 10/2002 | Bergerson et al. |

FOREIGN PATENT DOCUMENTS

| | | |
|---|---|---|
| WO | 95/11421 | 4/1995 |
| EP | 0 803 700 B1 | 10/1997 |
| EP | 0 943 503 A2 | 9/1999 |
| EP | 1 139 060 B1 | 10/2001 |
| EP | 1 323 596 A1 | 7/2003 |

In column 20, line 23, please replace "receptacle 746 serves as an adapter for" with --receptacle 746 serves as an adaptor for--

In column 20, line 26, please replace "the adapter socket 804" with --the adaptor socket 804--

UNITED STATES PATENT AND TRADEMARK OFFICE
CERTIFICATE OF CORRECTION

PATENT NO. : 7,401,810 B2
APPLICATION NO. : 11/041808
DATED : July 22, 2008
INVENTOR(S) : Dario G. Brisighella, Jr. et al.

It is certified that error appears in the above-identified patent and that said Letters Patent is hereby corrected as shown below:

In column 20, line 48, please replace "present invention, the adapter" with --present invention, the adaptor--

In column 20, line 51, please replace "to size the adapter socket 804" with --to size the adaptor socket 804--

In column 21, line 50, please replace "an adapter ridge 765" with --an adaptor ridge 765--

Column 22, In claim 1, line 46, please replace "initiator opening either" with --initiator opening from either--

Column 22, In claim 5, line 58, please replace "O-rings washers, and gaskets" with --O-rings, washers, and gaskets--

Column 23, In claim 11, line 17, please replace "initiator or adapter socket" with --initiator or adaptor socket--

Column 24, In claim 19, line 29, please replace "internal face, and size to" with --internal face, and sized to--

This certificate supersedes the Certificate of Correction issued September 23, 2008.

Signed and Sealed this

Fourteenth Day of October, 2008

JON W. DUDAS
*Director of the United States Patent and Trademark Office*